(12) United States Patent
Zhao (10) Patent No.: US 11,351,886 B2
(45) Date of Patent: Jun. 7, 2022

(54) SYSTEMS AND METHODS FOR ELECTRIC VEHICLES WITH MODULAR BATTERY PACKS (71) Applicant: Ruichen Zhao, Fremont, CA (US)

(72) Inventor: Ruichen Zhao, Fremont, CA (US)

( * ) Notice: Subject to any disclaimer, the term of this patent is extended or adjusted under 35 U.S.C. 154(b) by 83 days.

(21) Appl. No.: 16/278,133

(22) Filed: Feb. 17, 2019

(65) Prior Publication Data
US 2020/0231064 A1 Jul. 23, 2020

Related U.S. Application Data (60) Provisional application No. 62/794,965, filed on Jan. 21, 2019.

(51) Int. Cl.
B60L 53/80 (2019.01)
H01M 10/42 (2006.01)
H02J 7/00 (2006.01)
H01M 50/20 (2021.01)
H02M 3/335 (2006.01)

(52) U.S. Cl.
CPC ........... *B60L 53/80* (2019.02); *H01M 10/425* (2013.01); *H01M 50/20* (2021.01); *H02J 7/0045* (2013.01); H01M 2010/4271 (2013.01); H01M 2220/20 (2013.01); H02M 3/33523 (2013.01); Y02T 10/70 (2013.01)

(58) Field of Classification Search
CPC ..... B60L 53/80; H01M 2/1077; H01M 50/20; H02J 7/0045
USPC ................................. 320/109, 112, 113, 104
See application file for complete search history.

(56) References Cited

U.S. PATENT DOCUMENTS

| 9,868,421 | B2 | 1/2018 | Hassounah | |
|---|---|---|---|---|
| 2007/0188130 | A1* | 8/2007 | Scheucher | H01M 10/441 320/110 |
| 2011/0014501 | A1* | 1/2011 | Scheucher | B60L 53/11 429/7 |
| 2017/0093156 | A1 | 3/2017 | Ozbek et al. | |
| 2017/0093157 | A1 | 3/2017 | Pierquet et al. | |
| 2017/0279170 | A1* | 9/2017 | O'Hora | H02J 7/0042 |
| 2017/0372431 | A1* | 12/2017 | Perl | G07C 5/008 |
| 2019/0016231 | A1* | 1/2019 | Scaringe | H01M 10/63 |

* cited by examiner

Primary Examiner — Edward Tso
Assistant Examiner — Aaron Piggush (57) ABSTRACT

Electric vehicles with easily configurable and detachable battery modules are disclosed. An electric vehicle may include a battery module that includes a plurality of modular battery packs, each of which can be detached without affecting the normal functions of the electric vehicle. The number of modular battery packs installed on the electric vehicle can be configured by the manufacturer, retailer, and/or customer based on the customer's needs. Systems and methods of servicing electric vehicles with modular battery packs are also disclosed. Battery swapping and/or renting stations allows electric vehicle users to swapping batteries whose charges run low with fully charged batteries and/or to rent additional batteries to temporary use. A centralized or distributed data system may be used to track each modular battery pack's conditions such use history, capacity degrade, charge cycles, etc. The costs battery swapping and/or renting can be based conditions of the battery packs.

20 Claims, 7 Drawing Sheets

SYSTEMS AND METHODS FOR ELECTRIC VEHICLES WITH MODULAR BATTERY PACKS

CROSS-REFERENCE TO RELATED APPLICATIONS

This application claims priority to U.S. Provisional Patent Application No. 62/794,965, filed on Jan. 21, 2019 and entitled, "Systems and Methods for Electric Vehicles with Modular Battery Packs," the entire contents of which are herein incorporated by reference.

BACKGROUND

1. Field of the Invention

The present invention relates generally to electric vehicles, and more particularly, but not by way of limitation, to electric vehicles with detachable modular battery packs and systems and methods for configuring and servicing such electric vehicles.

2. Description of Related Art

In the current industry practices, different types of battery packs are designed and manufactured for different types of electric applications. For example, one type of battery pack is manufactured for electric vehicles, another type of battery pack is manufactured for electric scooters, and yet another type of battery pack is manufactured for energy storage systems (e.g., from wind farms or solar farms). The practice of using a different battery pack design for different types of applications is very cost inefficient, in terms of design costs and manufacturing costs. Further, the current practice brings inconvenience to customers because they cannot interexchange their battery packs between their devices. For example, currently electric vehicles use battery packs that are specially manufactured for certain models of electric vehicles: battery packs for Tesla electric vehicles are specially designed and manufactured for those models and cannot be easily configured for electric vehicles by other manufacturers such as Nissan and BMW. Therefore, there is a need for modularized battery packs where a universal battery pack design can be used in different types of applications, such as electric vehicles, electric scooters, electric aircraft, power storage, etc.

Further, in the current industry practices, battery packs for electric vehicles are not readily configurable. When a consumer by an electric vehicle, he has very limited freedom in terms of how he wants to configure the battery packs of his electric vehicle. And after the purchase, a consumer has very limited economical options to reconfigure the battery packs installed on his electric vehicle.

Yet another problem with the current practices is that it takes a long time to charge batteries for an electric vehicle. For example, even at a Tesla supercharging station, it will usually take over 20 minutes to partially charge a Tesla electric vehicle and could take over an hour to fully charge the electric vehicle. Such long wait to charge an electric vehicle waste lots of time and causes inefficiency.

SUMMARY

One object of the present disclosure is to provide universal modularized battery packs that can be used and interexchanged in various applications. A modular battery pack can be used as a building block to build larger battery packs that satisfy all sorts of power storage or supply needs, such as interchangeable battery packs for different types of devices such as electric vehicles of different models and/or from different manufacturers. This will largely reduce the costs of designs and manufactures of different types of battery packs. This technology would also significantly reduce the total battery demand to maintain global transportation and energy needs.

Another object of the present disclosure is to provide electric vehicles with easily configurable and detachable battery modules, which may include a battery module that includes a plurality of modular battery packs. The modular battery packs can be connected in series, in parallel, or the mix thereof depending on the power supply needs of the electric vehicle. Each of the plurality modular battery packs can be detached without affecting the normal functions of the electric vehicle. The number of modular battery packs installed on the electric vehicle can be configured by the manufacturer, retailer, and/or customer based on the customer's needs.

Yet another object of the present disclosure is to provide systems and methods of servicing electric vehicles with modular battery packs. Battery swapping and/or renting stations allows electric vehicle users to swapping batteries whose charges run low with fully charged batteries and/or to rent additional batteries to temporary use. A centralized or distributed data system may be used to track each modular battery pack's condition such use history, designed capacity, capacity degrade, charge cycles, etc. The costs of battery swapping and/or renting or the cost of the battery itself can thus be based on the historic operating conditions of the modular battery packs.

When the conditions of modular battery packs degrade, they can be recycled and used for other applications that have low performance requirements of battery packs, particularly with lower charging and discharging rates. For example, when the condition of a modular battery pack used on an electric vehicle degrades to a certain level, it can be recycled and used as energy storage purposes. The recycled modular battery pack may be used together with other battery packs and connected to a power grid and be charged with the redundant power from the power grid. And the electrical energy stored in these modular battery packs can then be used to provide power to consumers, charge other battery packs, etc.

An electric vehicle with configurable and detachable battery packs is disclosed. In some embodiment, the electric vehicle comprises: one or more electric motors, each connected to a power interface; a battery module configured to receive a plurality of battery packs and to provide electricity to the one or more electric motors; and a control unit coupled to the one or more electric motors and the battery module, the control unit configured to control the electric supply from the battery module to the one or more electric motors. The battery module is configured such that each of the plurality of battery packs is detachable and the battery module is functional when one or more of the plurality of battery packs are detached.

A method for manufacturing an electric vehicle is disclosed. In some embodiments, the method comprises: providing one or more electric motors, each connected to a power interface; providing a battery module configured to receive a plurality of battery packs and to provide electricity to the one or more electric motors; and coupling a control unit to the one or more electric motors and the battery module, the control unit configured to control the electric supply from the battery module to the one or more electric motors. The battery module is configured such that each of the plurality of battery packs is detachable and the battery module is functional when one or more of the plurality of battery packs are detached.

A method for providing a battery pack to an electric vehicle is disclosed. In some embodiments, the method comprises: charging multiple battery packs; making the multiple battery packs available at a station; and providing, at the station, one or more of the multiple battery packs to a user of an electric vehicle for installation in a battery module of the electric vehicle. The battery module is configured to receive a plurality of battery packs and to provide electricity to the one or more electric motors, and further configured such that each of the plurality of battery packs is detachable and the battery module is functional when one or more of the plurality of battery packs are detached.

A method for assessing the value of a battery pack is disclosed. In some embodiment, the method comprises: storing, by a first party, information about a battery pack; sharing the information about the battery pack with a second party; and, accessing, by the second party, a value of the battery pack based on the information about the battery pack. The information of the battery pack may be stored and shared using a centralized server or a distributed system using a blockchain based technology, for example.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

DESCRIPTION OF ILLUSTRATIVE EMBODIMENTS

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system or apparatus that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Further, a structure (e.g., a component of an apparatus, such as a cable) that is configured in a certain way is configured in at least that way, but it can also be configured in other ways than those specifically described.

Figure 1:
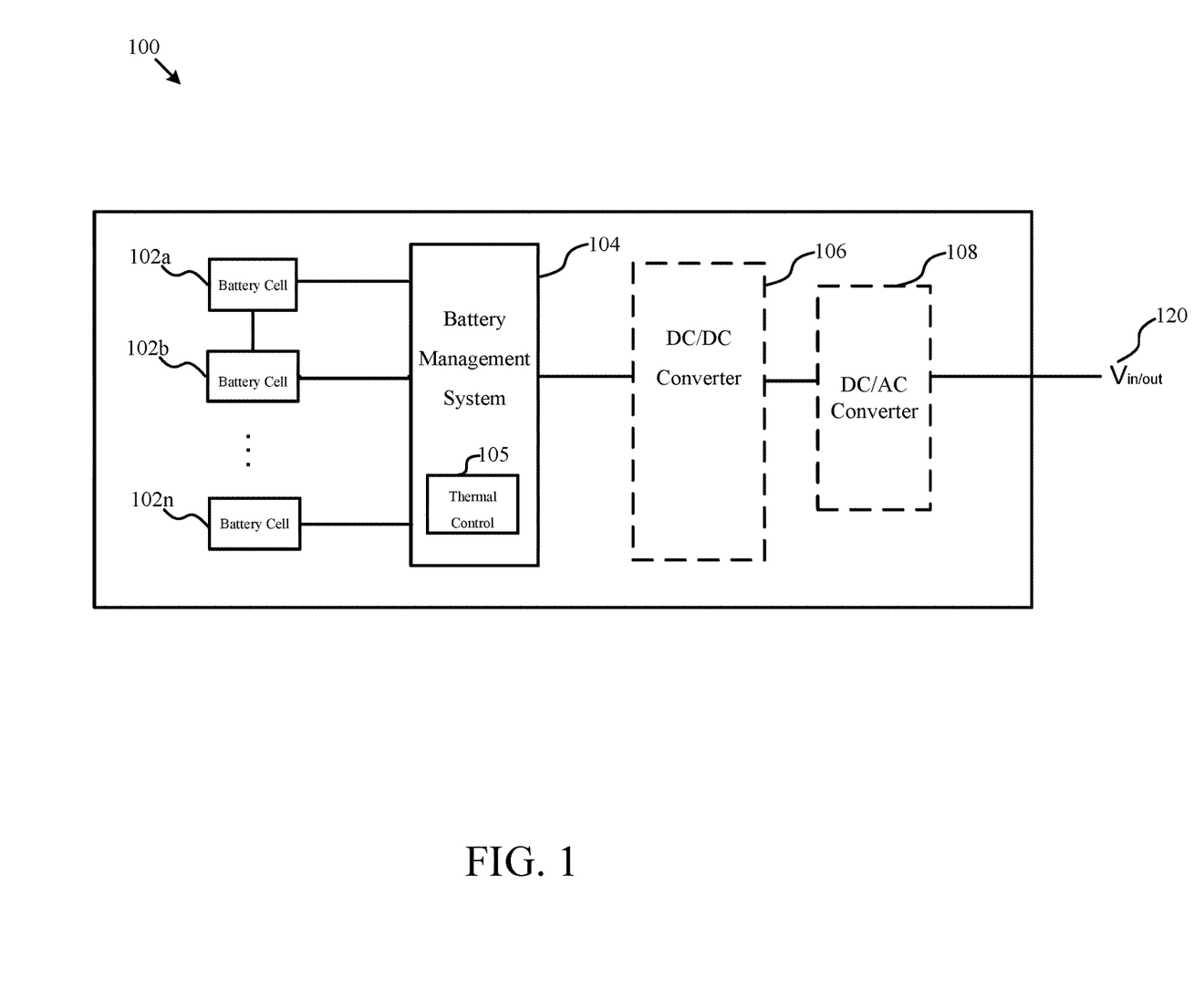
FIG. 1 illustrates a modular battery pack according to one aspect of the present disclosure.

FIG. 1 illustrates an example of a modular battery pack 100. In the depicted embodiment, battery pack 100 includes one or more battery cells 102a, 102b, . . . , 102n, each connected to a battery management system 104, which is in turn connected to a converter 106. Battery cells 102a, 102b, . . . , 102n may be connected in series provide higher voltage or in parallel to provide higher current, or the mix thereof. Each cell may be an industrial cell that can be easily charged and then supply power to various devices. Each battery cell may have a wide range of capacities available on the market.

Battery management system 104 may monitor the conditions and operating status of each battery cell and determining an operating mode for the cell. For example, battery management system 104 may include a thermal control system 105, which monitors (e.g., using a thermal sensor) the temperature of the battery cells and control the temperature of battery pack 100 to avoid operating the battery pack at a temperature that is too high or too low. When the temperature of certain battery cells goes above a high threshold or below a low threshold, battery management system 104 may shut off those battery cell(s). Similarly, battery management system 104 may shut off battery cells whose charge runs critically low, or when the cells have been fully charged to prevent overcharge, or the cells undergo an over current or short-circuit condition. In some embodiments, battery management system 104 may shut off the whole battery pack when some of the battery cells are not operating within the normal ranges (for example, the battery cells overheat or the temperature is too low, or charges run critically low) to ensure the optimal operation of the whole battery pack 100. Battery management system 104 may also be configured to monitor the health of battery cells 102 and indicate (e.g., by sending signals to an LED indicator or other system controllers) the health level of the battery cells and send alerts if one or more battery cells malfunctions.

In some embodiments, DC/DC converter 106 may be a CLLC converter, a dual-active-bridge converter, a full bridge converter, or any other type of DC/DC converter, which is described in more details below. Converter 106 may function as a DC/DC converter to provide a desired DC voltage output for battery pack 100. For example, a battery cell 102 may provide a DC voltage of 2.0V to 4.2V, battery management system 104 may provide a DC voltage of 30V to 400V, and converter 106 may convert the voltage input from battery management system 104 to a 400V DC output. In some embodiments, converter 106 may be other types of converters, such as a non-isolated boost converter or a conventional isolated full bridge converter (as defined from voltage stepping-up perspective). In some embodiments DC/DC converter 106 may be integrated into modular battery pack 100, or included in an electric device such as an electric vehicle that uses modular battery packs, or included in both or either modular battery pack 100 and/or electric devices. When DC/DC converter 106 is integrated in modular battery pack, it can be configured such that it can be overridden by a DC/DC converter included in an electric device such an electric vehicle using the modular battery pack.

In some embodiments, when AC output is needed, battery pack 100 may also include a DC/AC converter 108 so that battery pack 100 supply AC power to an external device. DC/AC converter 108 may be integrated into battery pack 100 and is only activated when AC power supply is needed from battery pack 100. Alternatively, DC/AC converter 108 may be manufactured as an accessory part and then connected to battery pack 100 whenever necessary. DC/AC converter 108 may also be included in an electronic device that requires AC input and converts the DC output from modular battery pack 100 into AC input for the device.

Generally, DC or AC power is supplied from battery pack 100 through port 120 to an external device. Port 120 can be configured to also charge battery cells 102 included battery pack 100. Battery management system 104 may monitor the charge levels of battery cells 102 and indicate (e.g., by changing the color of an LED indicator of the battery pack 100) when the charges of battery cells are low and need to be recharged. Similarly, battery management system 104 may send signals to indicate that battery cells 102 are fully charged and also shut off the charging power supply to prevent overcharging the battery cells.

Figure 2A:
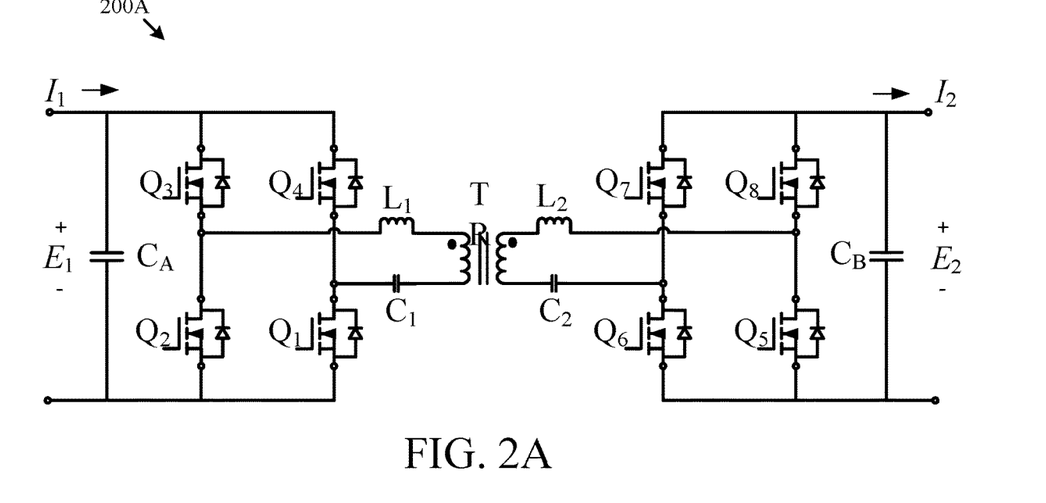
FIG. 2A illustrates an example of a DC/DC converter for a modular battery pack according to one aspect of the present disclosure.
Figure 2B:
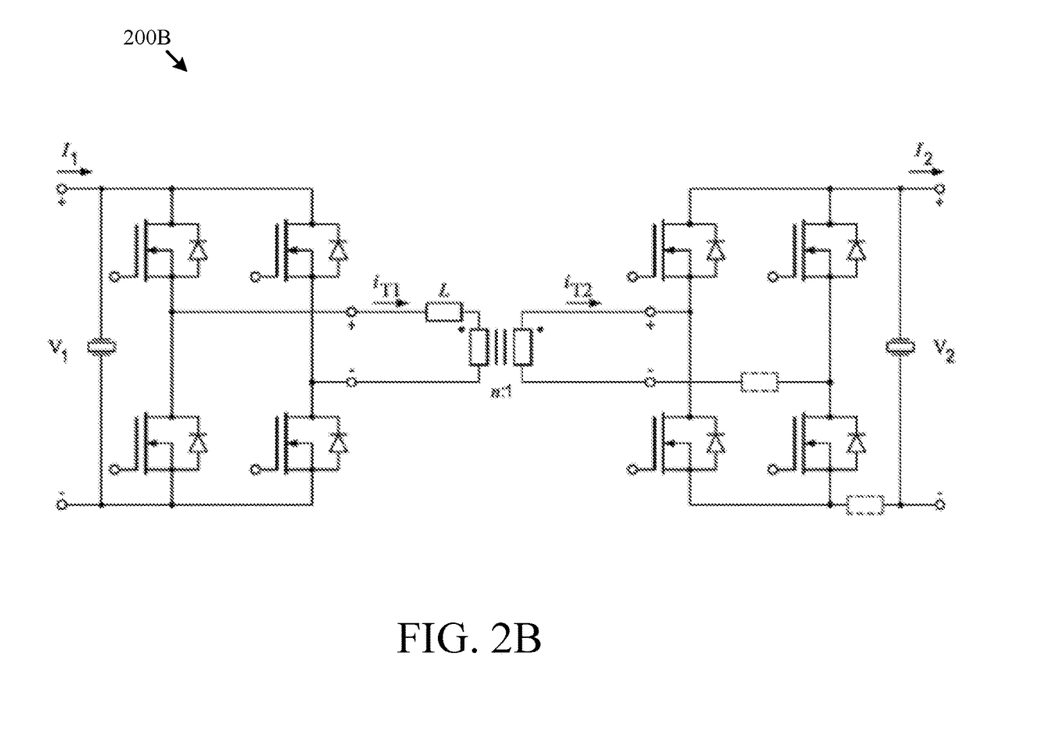
FIG. 2B illustrates an example of a DC/DC converter for a modular battery pack according to one aspect of the present disclosure.

FIGS. 2A and 2B illustrates examples of DC/DC converters that can be used for battery pack 100. FIG. 2A illustrates an example of a CLLC resonant converter 200A for battery pack 100. In the depicted embodiment, CLLC resonant converter 200 includes eight switches, Q1, Q2, . . . Q8, with four switches distributed on the left and right side of a transformer TR, respectively. Each switch may be a transistor switch, such as an MOSFET. Transformer TR is connected to L1 and C1 on one side, and L2 and C2 on the other side, which together forms a resonant network. CLLC resonant converter 200A may further include filters CA and CB, one of which is connected to the source side and the other connected to the load side. Current flows I1 and I2 through CLLC resonant converter 200A are bi-directional. Thus, in one embodiment, E1 can be the source and E2 the load, and in another embodiment, E2 can be the source and E1 the load.

For example, in one embodiment, E1 is connected to battery management system 104 as described in FIG. 1, where battery pack 100 is used to supply power to an external device. In this case, E1 is the source end of CLLC resonant converter 200A, and E2 is the load end connected to the external device; both I1 and I2 flow from left to right, switches Q1-Q4 function as a square wave generator, and switches Q5-Q8 function as a rectifier. When an external power source is connected to E2 to charge battery pack 100, the roles of the parts reverses: E2 becomes the source end and E1 becomes the load end connected to battery cells 102.

FIG. 2B illustrates an example of a dual-active-bridge (DAB) 200B DC/DC converter for battery pack 100. The dual-active-bridge converter can perform current sampling and/or operate in a burst mode in which its output varies as compared to a continuous mode of operation. It should be understood that other than CLLC resonant converter 200A and dual-active-bridge converter 200B, DC/DC converter 106 may be implemented as a full bridge converter or other DC-to-DC converter topologies in some embodiments.

Battery packs 100 may be manufactured in modularized units, such that multiple battery cells may be readily connected in series, in parallel, or the mix thereof to satisfy various power supply needs, e.g., from external devices requiring different voltage and/or current levels. The modularized battery packs 100 have a distinct advantage over the current battery industries, where different types of battery packs are manufactured for different devices. For example, in the current industry practices, one type of battery pack is manufactured for electric vehicles, another type of battery pack is manufactured for electric scooters, and yet another type of battery pack is manufactured for energy storage systems (e.g., from wind farms or solar farms). By modularizing battery packs 100 described above, a universal battery pack can be used in various situations; a modular battery pack 100 can be used as a building block to build larger battery packs that satisfy all sorts of power storage or supply needs. This will largely reduce the costs of designs and manufactures of different types of battery packs.

In some embodiments, battery pack 100 may also include a thermal control system. Air cooled or liquid cooled technologies can be used. The thermal control systems may be connected in series or parallel. The thermal control system may be integrated in to battery pack 100 so that battery pack 100 may be integrated into a single unit and modularized as described above.

Figure 3:
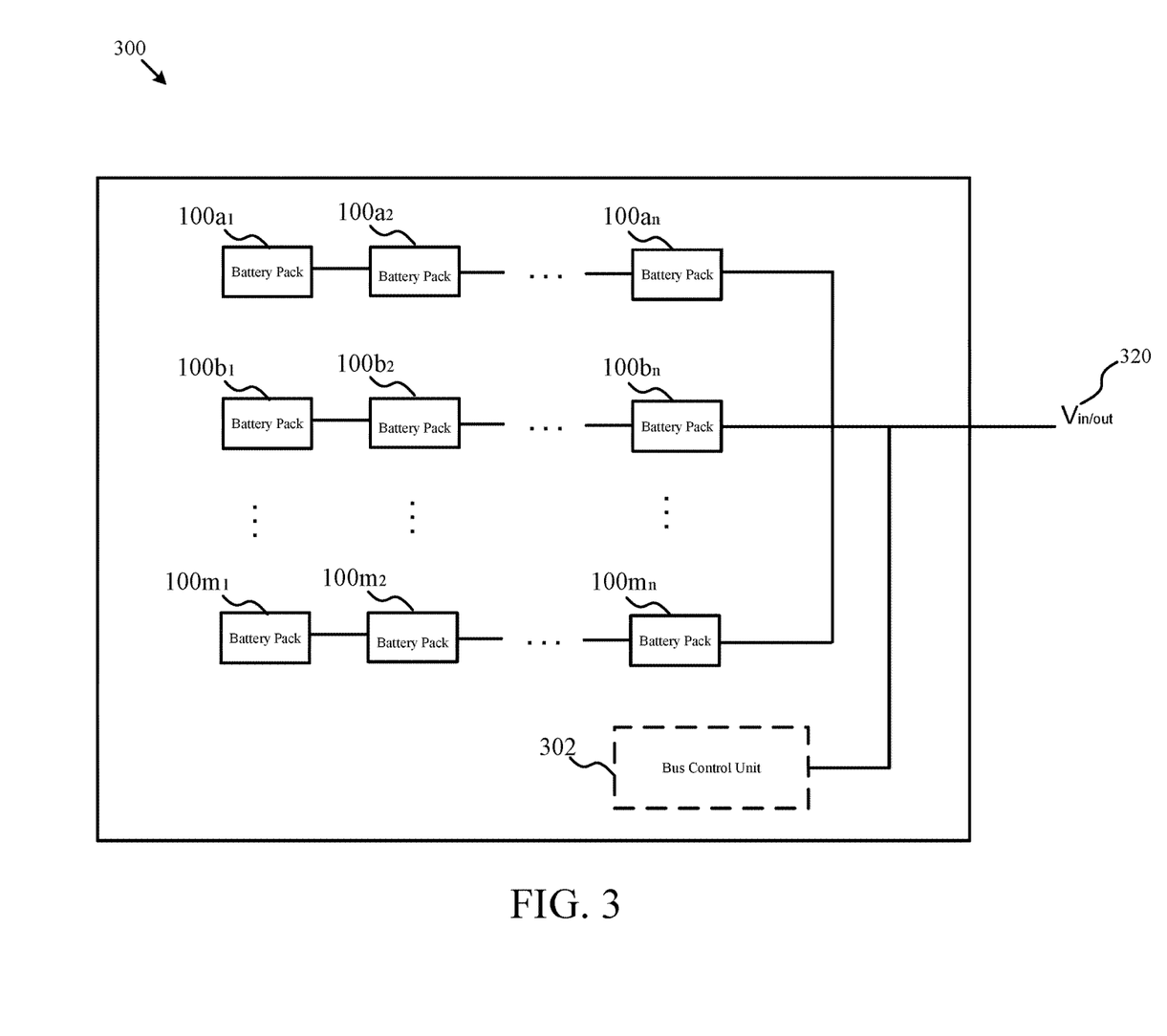
FIG. 3 illustrates an example of stacking multiple modular battery packs into a larger battery pack according to one aspect of the present disclosure.

FIG. 3 illustrate examples of stacking a plurality of modular battery packs 100 into a larger battery module 300 for different power supply needs. As depicted in FIG. 3, a plurality of modular battery packs 100 are connected in a mixed fashion to form a larger battery pack module 300. For example, battery packs 100a1, 100a2, . . . 100an are connected in series to form a sub-module 100a; battery packs 100b1, 100b2, . . . 100bn are connected in series to form a sub-module 100b; . . . ; battery packs 100m1, 100m2, . . . 100mn are connected in series to form a sub-module 100m. Then, the sub-modules 100a, 100b, . . . 100m are connected in parallel to form the final stacked battery pack module 300. Or, sub-modules can be connected in parallel first, then further be connected in series. With different combinations of connections using any number of modular battery packs 100, one can build a battery module 300 to satisfy any requirements of voltage or current output levels. It should be noted that different numbers of modular battery backs 100 may be connected in series, parallels, or the mix therefor into larger battery modules 300 in various ways other than that described above. Further, one or more modular battery packs 100 may be readily added to or removed from battery module 402, without affecting the normal functions of battery module 402.

In some embodiments, battery pack module 300 may further include a bus control unit 302. Bus control unit 302 may be configured to control the output voltage of individual modular battery packs 100 so that battery pack module 300 provides a stable voltage output 320. In some embodiments, bus control unit 302 may include a conventional battery pack, a capacitor, a fuel cell, a power electronics device, and/or another modular battery pack.

Figure 4:
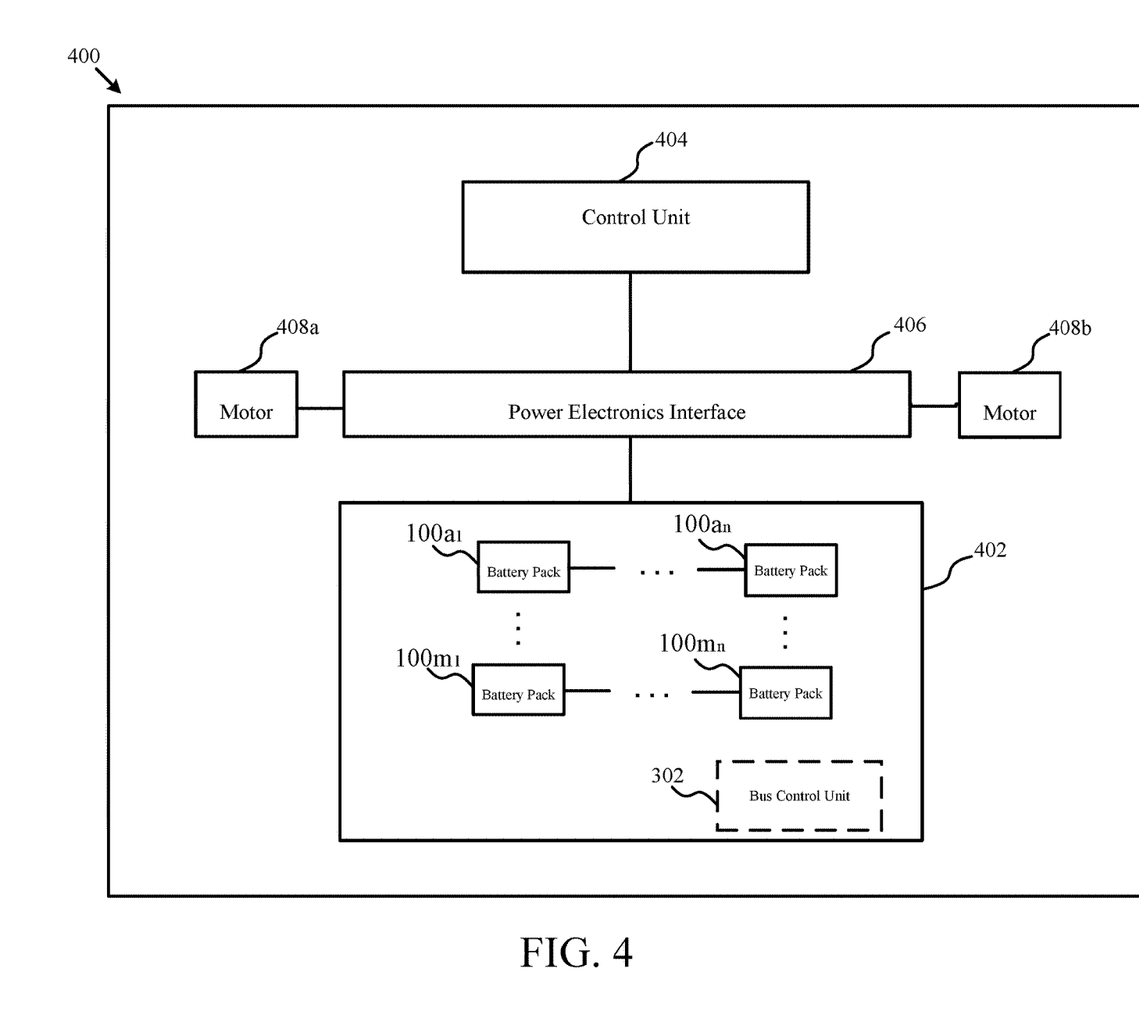
FIG. 4 illustrates an example of an electric vehicle installed with multiple modular battery packs according to one aspect of the present disclosure.

Bus control unit 302 may be integrated into battery pack module 300, or alternatively be supplied as a separate unit and connected to battery pack module 300. For example, as illustrated in FIG. 4, bus control unit 302 may be pre-installed on an electric vehicle and connected to modular battery packs 100 and/or battery pack modules 300 when the battery packs or battery modules are installed on the electric vehicle. When bus control unit 302 is installed in an electric vehicle, it may be configured to control or clamp the bus voltage in parallel with one or multiple modular battery packs 100 and/or one or more battery pack modules 300.

Individual battery packs 100 or their stacked versions into large battery pack modules 300 as described in FIG. 3 may be used to supply DC and/or AC power to any external devices that requires electric power supply, such as electric vehicles, electric scooters, electric aircrafts (unmanned or manned aircrafts), electric boats, battery swap stations (e.g. for fast electric vehicle recharging), or other electric appliances. Battery packs 100 may also be used in devices equipped with solar panels, such that battery packs 100 may be charged by solar energy collected by solar panels and then supply power to the devices. Stacked battery packs 100 may also be used as energy storage systems. For example, a plurality of battery packs 100 may be stacked together to store redundant electricity generated by power stations and then used to supply power to a power grid when needed. This can be especially useful for wind power, solar power, or hydraulic power generation stations, where the amount of electricity generated depends on the source of wind, solar, or water flow, which generally cannot be controlled based on the amount of power consumption. Thus, when the wind, sunlight, or water flow is strong, redundant electricity (the amount that exceeds power consumption need at any certain time instance) is wasted and cannot be used later. Stacked battery packs 100 can be connected to the wind, solar, or hydraulic power grid and be charged by the redundant power in the grid. When the power consumption exceeds the amount of power generated by the power station, power can then be drawn from battery packs 100 for consumer use.

FIG. 4 illustrates an electric vehicle 400 configured to be powered by a plurality of modular battery packs 100. In the depicted embodiment, electric vehicle 400 may include a battery module 402, which may be readily detached from electric vehicle 400. When installed on electric vehicle 400, battery module 402 is electrically coupled to one or more motors 408a, 408b through a power electronics interface 406. Battery module 402, motors 408a, 408b, and power electronics 406 are each connected, directly or indirectly, to a control unit 404. Battery module 402 may include a plurality of modular battery packs connected in parallel and/or in series, such as in a way described in FIG. 3 above. For example, battery module 402 may include a plurality of modular battery packs 100a1, ..., 100an, which are connected in series to form a sub-module. In some embodiments, battery module 402 may also include another plurality of modular battery packs 100m1, ..., 100mn, which are connected in series to form another sub-module, which may be connected in parallel to sub-module formed by modular battery packs 100a1, ..., 100an. It should be noted that battery module 402 may include any desired number of modular battery packs connected in series, in parallel, or the mix thereof to satisfy the designed power requirements for electric vehicle 400. Further, one or more modular battery packs 100 may be readily added to or removed from battery module 402, without affecting the normal functions of battery module 402.

In some embodiments, battery module 402 may include a bus control unit 302, which has been described above in connection with FIG. 3. Alternatively, bus control unit 302 may be pre-installed on electric vehicle 400 and then coupled to battery module 402 when the battery module is installed on the vehicle. Bus control unit 302 may be implemented as a voltage source, e.g., a modular battery pack or a conventional energy storage device, and can provide power to electric vehicle 400. For example, bus control unit 302 may be an energy storage device with a voltage level of approximately 400 V, an energy capacity of approximately 30 kWh, and a rated power of approximately 90 kW. The bus control unit 302 may be configured to clamp the bus voltage on an electric vehicle effectively and provide pulsating power needs during acceleration of the electric vehicle. In this case, if modular battery packs 100 are not installed on electric vehicle 400, then electric vehicle 100 may be powered by the bus control unit 302, which functions as an independent energy storage system (for example, the energy stored in bus control unit 302 may provide a distance range of approximately 100 miles for electric vehicle 400). When additional modular battery packs 100 are installed on electric vehicle 400, they can function as current sources to bus control unit 302. For example, each modular battery pack 100 may have a voltage level of about 4 kW and energy capacity of about 4 kWh; then if electric vehicle 400 is installed with ten modular battery packs 100, then the electric vehicle has a total maximum voltage level of 130 kW (i.e., 90 kW from bus control unit 302 and 40 kW from ten modular battery packs 100) and a maximum energy capacity of 70 kWh (i.e., 30 kWh from bus control unit 302 and 40 kWh from ten modular battery packs 100).

As has been noted above in descriptions related to FIG. 3, bus control unit 302 may be integrated into battery module 402 on an electric vehicle 400, or alternative in an independent battery module 300 (which may then be detachably installed on electric vehicle 400). It should be also noted that bus control unit 302 is optional. That is, in some embodiments, battery module 402 does not include a bus control unit 302, and the battery packs received by battery module 402 does not have bus control unit 302 either. Generally, bus control unit 302 does not include an DC/DC converter, while modular battery packs 100 may include a DC/DC converter, such as illustrated FIG. 1 (e.g., DC/DC converter 106). In a preferred embodiment, when bus control unit 302 is installed in battery module 300 or 400, each of modular battery packs 100 would include a DC/DC converter, while bus control unit 302 does not include a DC/DC converter.

Power electronics interface 406 may include one or more inverters configured to provide the proper electric voltage input to motors 408a, 408b. In some embodiments, power electronics interface 406 may also include one or more DC/DC converters, such as CLLC converters, DAB converters, resonant converters, full bridge converters, or the like such as described above. When one or more of the individual modular battery packs 100 also include a DC/DC converter integrated within, the DC/DC converters in power electronics interface 406 may be configured to override the DC/DC converters in individual modular battery packs 100.

The use of modular battery packs in battery module 402 makes it easily configurable. One or more individual modular battery packs in battery module 402 can be easily removed from battery module 402, and the remaining battery packs in battery module 402 can still provide enough power supply for electric vehicle 400 to function normally. Conversely, one or more modular battery packs can be easily added to battery module 402 to provide longer battery range for electric vehicle 400. The easy configuration of battery module 402 for electric vehicle 400 brings a number of benefits to the manufacturing, use, and maintenance of electric vehicle.

In one scenario, the ease of modular battery pack configuration allows an electric vehicle manufacturer, retailer, and/or customer to configure an electric vehicle on demand. For example, to reduce the cost of electric vehicle 400, a user can buy electric vehicle 400 installed with the minimum number of battery packs (say, 6 modular battery packs, just as an example), which could provide a battery range for normal daily uses (say, one full battery charge can last for 200 miles). On the other hand, another user may want longer range for his electric vehicle and may choose to buy an electric vehicle with more modular battery packs installed in the vehicle, (say, e.g., 10 modular battery packs or as many battery modular packs that the electric vehicle can house), so that he can get a longer distance for one full charge (e.g., 350 miles for one full charge). Essentially, an electric manufacturer or retailer can give its customers the option to configure their electric vehicles based on their needs and choose how many modular battery packs they want to install in their electric vehicles when they purchase electric vehicles.

In the current industry practice, a battery's value over its entire life cycle has not been exploited effectively. For instance, due to long distance drive needs, an electric vehicle, say, a Tesla Model S is equipped with a 100 kWh battery pack. Such a battery pack supports approximately a 350-mile range and such a battery pack costs around 30 thousand dollars. However, the average daily car mileage in the US in 2018 is approximately 30 miles. Hence, a 100-to-150-mile battery range vehicle would be sufficient for an electric car owner for everyday use. However, a car owner would need a 350-mile battery range vehicle for long-distance drive (which is a low-frequency need). The conventional architecture forces an electric vehicle owner to purchase a large battery pack (say 100 kWh) for low-frequency needs, which results in less effective use of such a high value asset. This problem can be solved by using modular battery packs which can be connected in parallel and dispatched independently. Therefore, an electric vehicle car owner can equip or adjust the battery size by demand: less battery packs can be used for everyday use, and more battery packs can be installed to a car for long-distance drive. As such, a car owner can adjust the number of modular battery pack by demand so the cost of car ownership can be significantly reduced. Furthermore, modular battery packs are smaller and lighter so it may be more cost-effective to swap modular battery packs than conventional bulky battery packs.

The ease of modular battery pack configuration, also allows a customer to conveniently reconfigure his electric vehicle after purchase, for example, by purchasing, renting, or borrowing additional modular battery packs and installing them on his electric vehicle whenever needed. For example, if an electric vehicle owner needs to drive his vehicle for a long trip, he may purchase, rent, or borrow additional battery packs and install them on his electric vehicle before his trip. He can even bring extra battery backs with him so that when some of the battery packs run low on charge, he can simply replace those battery packs installed on his electric vehicle with the extra battery packs. Further, when some of the battery packs on an electric vehicle run low on charge, a customer may choose to charge only those individual battery packs instead of all battery packs installed on the electric vehicle, which may allow him to get the vehicle ready for use faster.

Reconfigurable electric vehicles with modular back packs also allows vendors to provide services such as battery renting, swapping, sharing, and/or recycling for electric vehicles owners and customers. For example, a battery renting station may have a plurality of fully charged modular battery packs in store, and rent out the battery packs to electric vehicle owners. The renting fee for each battery pack can be assessed based on the length of rental period and/or the amount electric charges used by the renter.

Similarly, a battery swapping station may store a plurality of fully charged modular battery packs and allow electric vehicle users to stop by the swapping station and swap one or more low-charge battery packs from their vehicles with one or more fully charged battery packs. The battery swapping station then recharges modular battery packs swapped from electric vehicle users and then place them on the stack for the next swapping. This battery swapping allows an electric vehicle user to quickly replace their battery packs when their charges run low, rather than waiting at a battery charging station, which can take a fairly long time to fully recharge an exhausted battery pack for a vehicle. Further, battery swapping stations may be configured to use clean energy such as electricity from a power grid connected to a wind farm or solar farm to charge the modular battery packs. In some embodiments, a station may provide both battery renting and swapping services.

Individuals can also to provide certain services to assist the efficient operation of reconfigurable electric vehicles with modular back packs. For example, an electric vehicle owner may rent out one or more of his modular battery packs (e.g., when he does not need them) to battery renting/swapping stations and receive certain payments from the battery pack lease. For the convenience of customers, battery renting/swapping stations may allow a customer to rent battery packs at one location and return them at another location. At a certain time period, some battery renting/swapping stations may end up having more battery packs than they need while other battery renting/swapping stations may end up having less battery packs than they need. In this situation, renting/swapping stations may request customers or individuals to transport one or more battery packs from one renting/swapping station to another renting/swapping station for a fee.

An additional way to exploit the residual value of a modular battery pack is to use a retired car modular battery pack in other applications, for example, as a stationary energy storage. One of the benefits of using modular battery packs is that they do not have to be dismantled before reuse. So the high value battery can have a second life with minimum effort.

Because universal modular battery packs are installed on electric vehicles such as electric vehicle 400 described above, when the battery packs are not needed for the electric vehicles, the battery packs can be used for other purposes too. For example, after a period of usage and/or certain number of recharging, a modular battery pack does not hold charge as well as before and may not be ideal for use in an electric vehicle. The degraded modular battery backs can then be recycled and used for other purposes, such as electricity storage for power grids connected to a power station (e.g., wind farm or solar farm), electricity storage for household uses, for other devices that have lower requirements for batteries, or the like.

Figure 5:
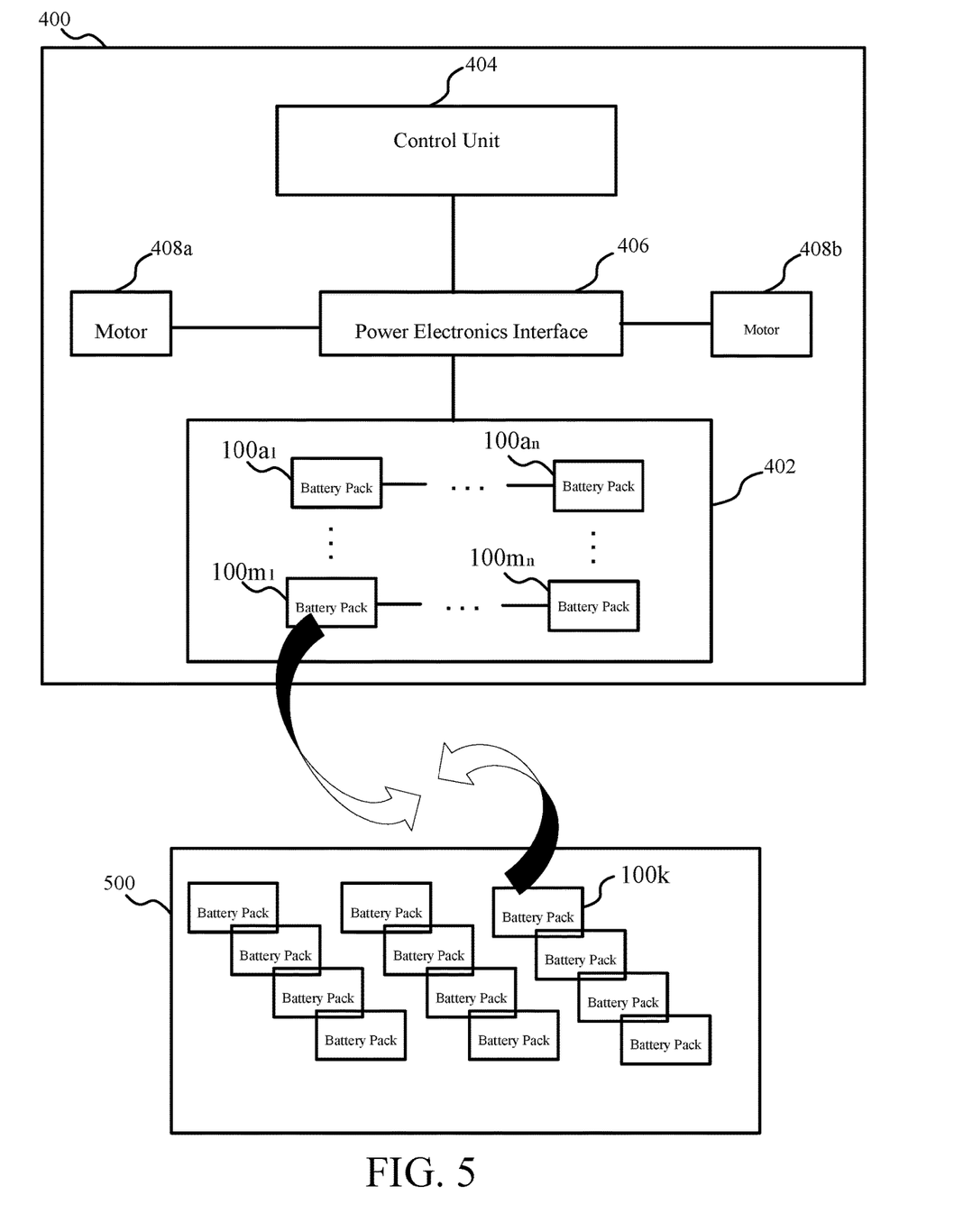
FIG. 5 illustrates a battery swapping and/or renting station where an electric vehicle can swap and/or rent one or more of its modular battery packs according to one aspect of the present disclosure.

FIG. 5 illustrates a battery swapping and/or renting station where an electric vehicle can swap one or more of its modular battery packs. In the depicted embodiment, battery swapping/renting station 500 stores a plurality of modular battery packs 100, all fully charged for renting and swapping. When electric vehicle 400 needs to rent and/or swap one or more of its battery packs, it stops at the swapping and/or renting station for the transactions. For example, battery pack 100$m$1 installed on electric vehicle 400 may have run low on charge and need to be recharged. Instead of waiting for battery pack 100$m$1 being charged at a charging station, the user may simply swap battery pack 100$m$1 with a fully charged battery pack 100$k$ at battery swapping and/or renting station, which is faster than recharging battery pack 100$m$1. Battery pack 100$m$1 is then left at the station for recharging and afterwards for swapping again. Additionally, if the user chooses to, he may also rent one or more additional battery packs and install them on electric vehicle 400 for longer driving range of the vehicle. It should be understood that the station 500 described here may only provide either battery swapping or renting services in some embodiments and provide both services in other embodiments.

To more accurately track the life of modular battery packs and assess their values at certain time, each modular battery pack's information may be logged and managed by a centralized server or distributed technologies, e.g., blockchain. As an example, each modular battery pack is assigned a unique identification number, and a shared ledger powered by a blockchain platform can be used to support a battery pack fleet management and battery life cycle management. Such a ledger shows critical information of a modular battery pack from start of use, such as number of charge cycles, total kilo-watt-hour charged or discharged, capacity, adverse conditions (over/under temperature, over/under voltage, over current conditions, etc.), internal resistance, coulombic efficiency, etc. Therefore, in a real time manner, a battery pack's use history is available to the fleet system and users. Therefore, it is efficient to evaluate the health condition and residual value of a battery pack. Such a platform may provide a cost-efficient way to build trust when swapping, borrowing or lending, exchanging, and reusing battery packs for stationary storage applications. For example, at a battery renting and/or swapping station, when a modular battery pack is swapped with another modular battery pack, the residual values of the two modular battery packs are assessed at the time of swapping, and the customer is then charged based on such assessment. Such a platform results in efficient collaboration, streamlined fleet management, and more effective asset utilization.

Figure 6:
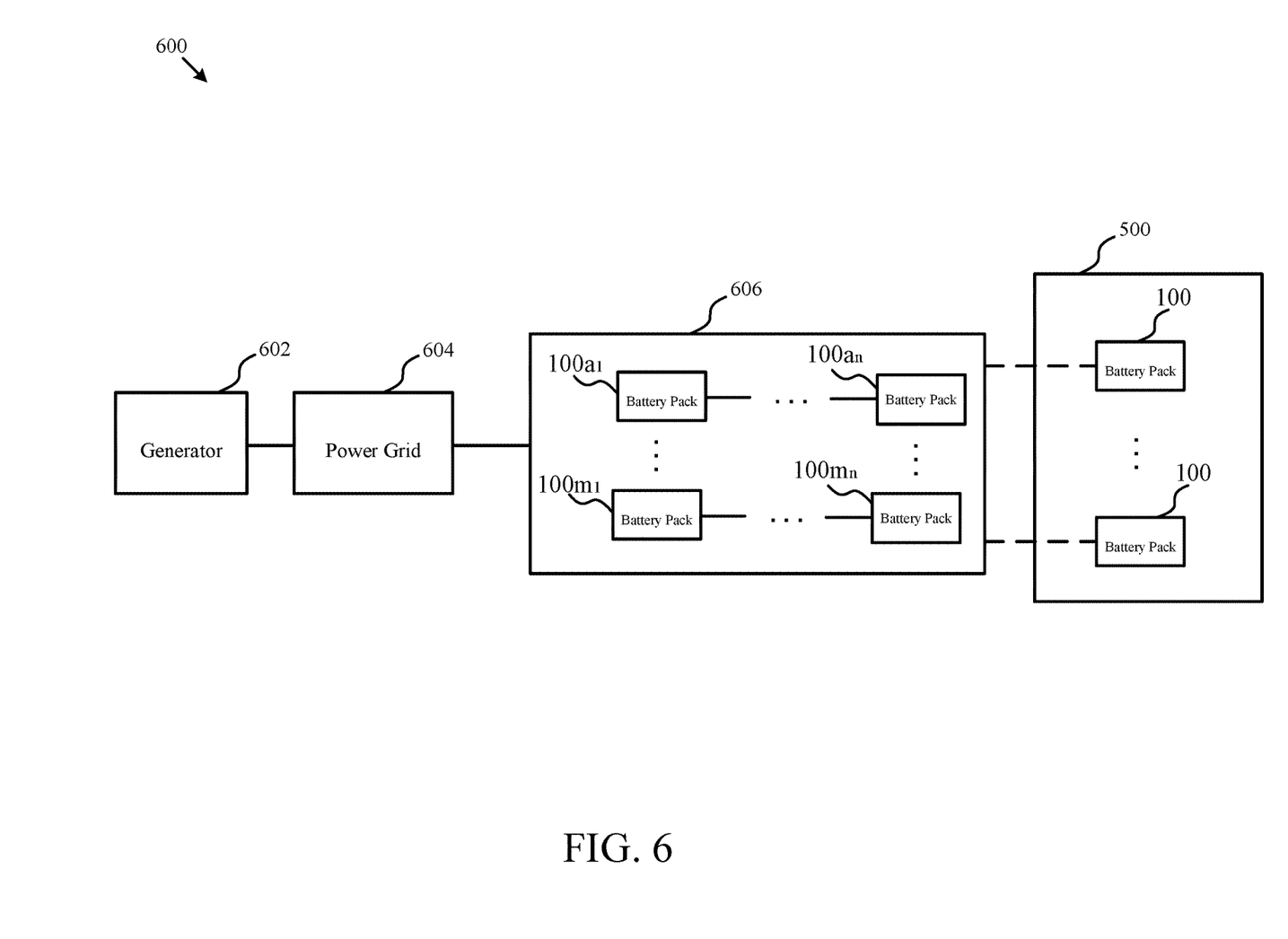
FIG. 6 illustrates a system where modular battery packs are used for different purposes at different locations according to one aspect of the present disclosure.

FIG. 6 illustrates a system 600 where modular battery packs are used to store electric energy from power grid and are then in turn used to charge modular battery packs at another location such as a battery swapping and/or renting station. In the depicted embodiment, one or more generators 602 are connected to an energy source to generate electricity and supply power to a power grid 604. For example, generators 602 may be powered by wind turbines, solar panels, hydraulic turbines, or nuclear energy sources. One or more battery pack modules 606 may be connected to power grid 604 and store redundant electricity from power grid 604. At a certain time period, redundant power may be the amount electricity supplied by power grid that exceeds the amount of electricity needed by consumers connected to the power grid. Usually, such redundant power is wasted. However, battery pack modules 606 can store such redundant power that would have otherwise be wasted and then be used to supply electricity when needed, e.g., at a lower price. For example, electricity stored in battery modules 606 may be used to charge other modular battery packs 100 at a battery swapping and/or renting station 500. This saves energy and also allows battery swapping and/or renting station to charge modular battery packs 100 at a lower price. Further, individual battery packs 100 used in battery back module 600 may be degraded battery packs recycled from other applications such as electric vehicles, which further reduces the cost of storing and supplying electricity to consumers.

Figure 7:
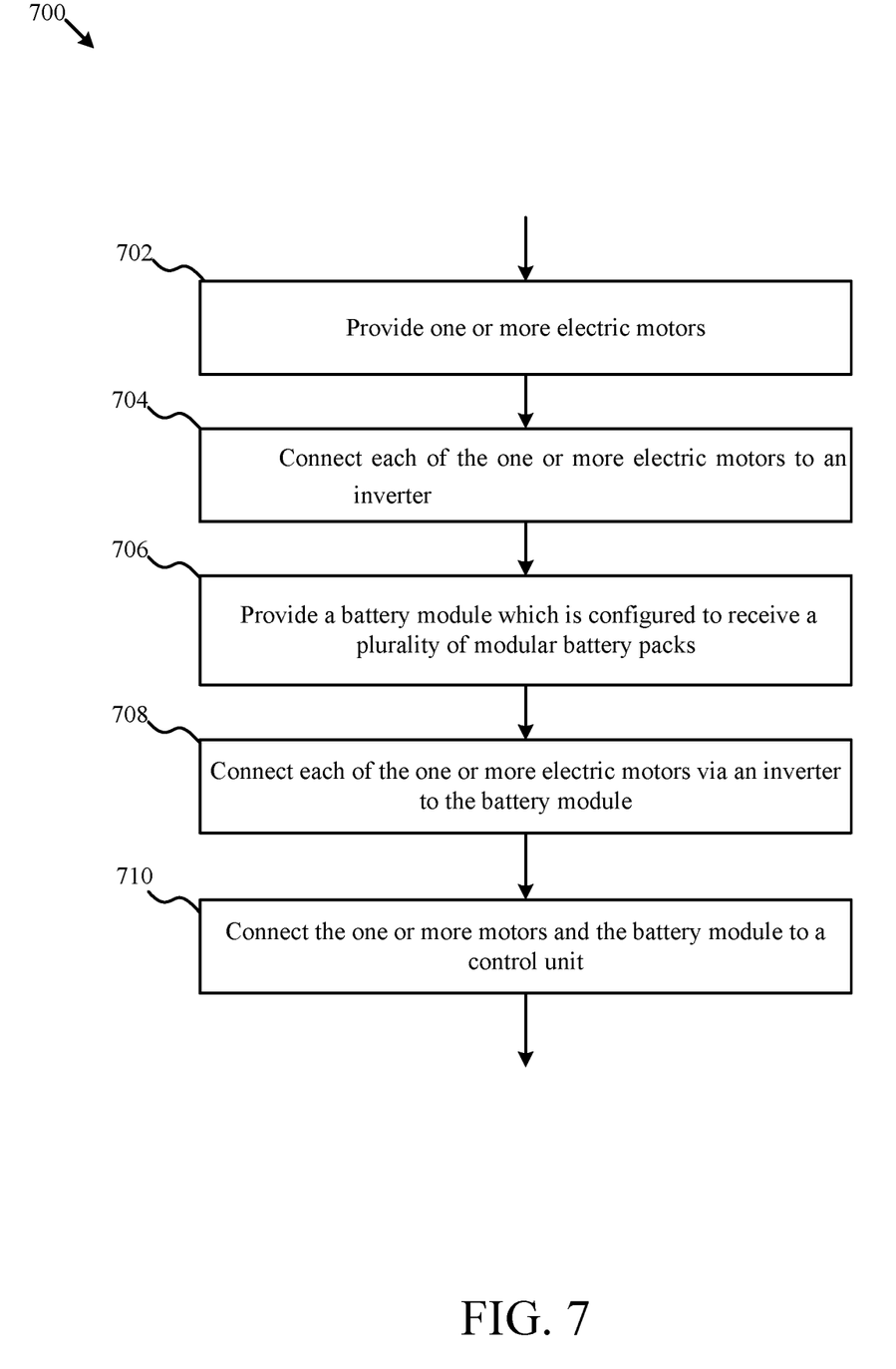
FIG. 7 illustrates a method for manufacturing an electric vehicle configured to be powered by a number of modular battery packs according to one aspect of the present disclosure.

FIG. 7 illustrates a method 700 for manufacturing an electric vehicle configured to be powered by a number of modular battery packs. In the depicted embodiment, method 700 includes providing 702 one or more electric motors, and connecting 704 each of the one or more electric motors to an inverter in the power electronics interface 406. Step 706 provides a battery module, which is configured to receive a plurality of modular battery packs, such as those described above in connection with FIGS. 1-5. At step 710, a control unit is connected to the one or more electric motors and battery module to control the functioning of the electric motors and battery module.

Each of the plurality of modular battery packs may be conveniently detached from the battery module, which can still normally function to power the motors with the remaining battery packs. The battery module may have a maximum capacity of receiving a predetermined number of battery packs, denoted as $B_{max}$. At any given moment, the battery module may have any number (between 1 and $B_{max}$) of battery packs installed in order to power the electric vehicle. When a plurality of battery packs are installed in the battery module, the battery packs may be connected in series, in parallel, or the mix thereof. The flexible configuration of the number of battery packs installed in the battery module thus allows an electric vehicle manufacturer, retailer, or a user to configure the electric vehicle based on the demand of the vehicle user.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. An electric vehicle comprising:
   one or more electric motors, each electrically connected to a power electronics interface;
   a reconfigurable battery interface module electrically connected to the power electronics interface and configured to receive a plurality of modular battery packs; and
   a control unit electrically connected to the one or more electric motors and the reconfigurable battery interface module, the control unit configured to control the electric power supply from the reconfigurable battery interface module to the one or more electric motors;
   wherein the plurality of modular battery packs include a minimum number of modular battery packs to provide sufficient electric power supply for the electric vehicle to fully function and further includes one or more additional modular battery packs to provide extended mileage for the electric vehicle; and
   wherein each of the plurality of modular battery packs is configured to be quickly removable from the reconfigurable battery interface module and the electric vehicle is configured to fully function with at least the minimum number of modular battery packs left in the reconfigurable battery interface module.

2. The electric vehicle of claim 1, wherein each of the plurality of modular battery packs includes a DC/DC converter coupled to a battery management system.

3. The electric vehicle of claim 1, wherein the electric vehicle further comprises a bus control unit, where the bus control unit is coupled to the reconfigurable battery interface module and configured to regulate or clamp a voltage output of the reconfigurable battery interface module.

4. The electric vehicle of claim 1, wherein each of the plurality of modular battery packs is configured to be exchangeable with another modular battery pack from another electric vehicle.

5. The electric vehicle of claim 1, wherein some of the plurality of modular battery packs are connected in series and some of the plurality of modular battery packs are connected in parallel.

6. A method for manufacturing an electric vehicle, the method comprising:
   providing one or more electric motors, each electrically connected to a power interface;
   providing a reconfigurable battery interface module and electrically connecting the reconfigurable battery interface module to the power electronics interface, wherein the reconfigurable battery interface module is configured to receive a plurality of modular battery packs; and
   coupling a control unit to the one or more electric motors and the reconfigurable battery interface module, wherein the control unit is configured to control the electric power supply from the reconfigurable battery interface module to the one or more electric motors;
   wherein the plurality of modular battery packs include a minimum number of modular battery packs to provide sufficient electric power supply for the electric vehicle to fully function and further includes one or more additional modular battery packs to provide extended mileage for the electric vehicle; and
   wherein each of the plurality of modular battery packs is configured to be quickly removable from the reconfigurable battery interface module and the electric vehicle is configured to fully function with at least the minimum number of modular battery packs left in the reconfigurable battery interface module.

7. The method of claim 6, wherein each of the plurality of modular battery packs includes a DC/DC converter coupled to a battery management system.

8. The method of claim 6, wherein the electric vehicle comprises a bus control unit, where the bus control unit is coupled to the reconfigurable battery interface module and configured to regulate or clamp a voltage output of the reconfigurable battery interface module.

9. The method of claim 6, wherein at least one of the plurality of modular battery packs is configured to be exchangeable with another modular battery pack from another electric vehicle.

10. The method of claim 6, wherein some of the plurality of modular battery packs are connected in series and some of the plurality of modular battery packs are connected in parallel.

11. A method for providing a modular battery pack to an electric vehicle comprising a reconfigurable battery interface module, the method comprising:
    charging multiple modular battery packs;
    making the multiple modular battery packs available at a station; and
    providing, at the station, one or more of the multiple modular battery packs to a user for installation in the reconfigurable battery interface module of the electric vehicle;
    wherein the reconfigurable battery interface module is configured to receive a plurality of modular battery packs;
    wherein the plurality of modular battery packs include a minimum number of modular battery packs to provide sufficient electric power supply for the electric vehicle to fully function and further includes one or more additional modular battery packs to provide extended mileage for the electric vehicle; and
    wherein each of the plurality of modular battery packs is configured to be quickly removable from the reconfigurable battery interface module and the electric vehicle is configured to fully function with at least the minimum number of modular battery packs left in the reconfigurable battery interface module.

12. The method of claim 11, further comprising receiving a not fully charged modular battery pack from the user of the electric vehicle for each of modular battery packs provided to the user of the electric vehicle.

13. The method of claim 11, further comprising:
    receiving one or more modular battery packs from a second user of an electric vehicle;
    paying a fee to the second user of an electric vehicle for each modular battery pack received;
    electrically charging the one or more modular battery packs received from the second user of an electric vehicle; and
    providing, at the station, one or more of the modular battery packs received from the second user of an electric vehicle to a third user of an electric vehicle.

14. The method of claim 11, further receiving one or more modular battery packs from a deliverer, and paying a fee to the deliverer for each modular battery pack received, wherein the deliverer transports the one or more modular battery packs to the station from another station.

15. The method of claim 11, wherein each of the plurality of modular battery packs includes a DC/DC converter coupled to a battery management system.

16. The method of claim 11, wherein each of the plurality of modular battery packs is configured to be exchangeable with another modular battery pack from another electric vehicle.

17. The method of claim 11, further comprising assessing the value of each of the multiple modular battery packs and charging the user a fee based on the assessed value.

18. The method of claim 17, wherein assessing the value of a modular battery pack is based on information of the modular battery pack supply by a blockchain system.

19. The method of claim 11, wherein each of the multiple modular battery packs is associated with a unique identification number.

20. The method of claim 18, wherein the information includes at least one of: number of charge cycles, total kilo-watt-hour charged or discharged, capacity, adverse conditions experienced, internal resistance, and coulombic efficiency.

* * * * *